Jan. 16, 1923. G. BAKER. 1,442,636.
TIRE AND HOOP ROLLING MILL.
FILED JUNE 14, 1921. 2 SHEETS—SHEET 1.
Fig.1.
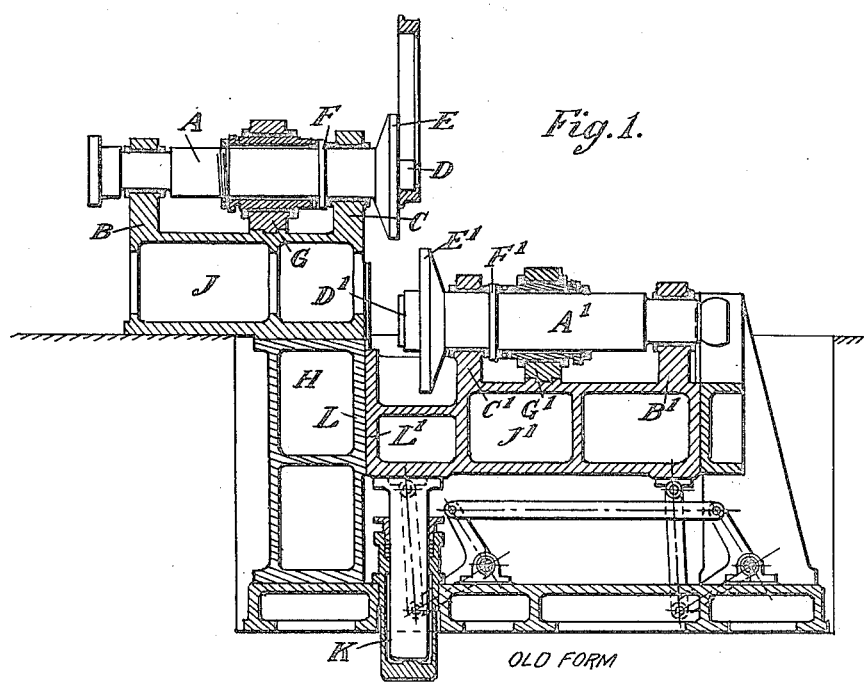
OLD FORM
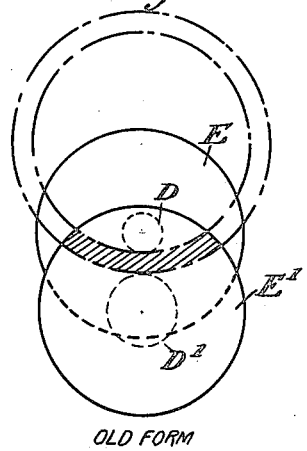
Fig.2.
OLD FORM
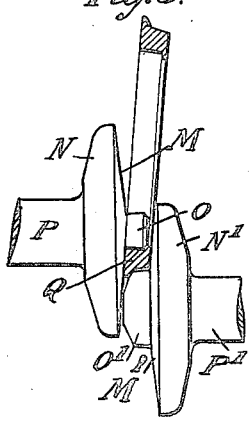
Fig.3.
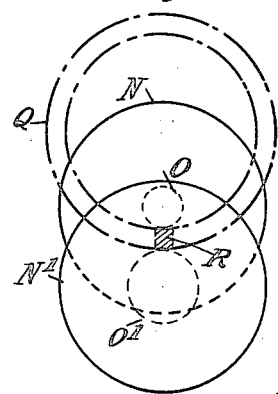
Fig.4.
Inventor
George Baker
By
Attorney Inventor
George Baker Patented Jan. 16, 1923.

1,442,636

UNITED STATES PATENT OFFICE.

GEORGE BAKER, OF SWINTON, ENGLAND.

TIRE AND HOOP ROLLING MILL.

Application filed June 14, 1921. Serial No. 477,572.

*To all whom it may concern:*

Be it known that I, GEORGE BAKER, a subject of the King of Great Britain, residing in Swinton, England, have invented certain new and useful Improvements in Tire and Hoop Rolling Mills, of which the following is a specification.

My invention relates to tire and hoop rolling mills of the kind comprising a pair of roll shafts each of which is driven and passes through a thrust block bearing, and wherein the parts of the rolls which operate directly on the work, are made to overhang their bearings, and the remaining parts of the co-operating rolls, are extended in opposite directions, and in one and the same plane.

In such mills each roll is provided with a large diameter flange, either integrally formed or otherwise associated with it. The flange is arranged at such a distance from the end of the roll that when the end of the roll abuts, or thereabouts, on the face of the flange of the other roll, the space between the faces of the flanges corresponds with the width of the tire or hoop to be rolled. This arrangement forms a box-like pass in which the rolling or shaping is effected. Both rolls are driven, one of the rolls being supported on a fixed bed, whilst the other is carried on a movable carriage which is capable of being reciprocated in the plane containing the axes of the rolls and so as to apply pressure to the material being rolled, and to enable the tire or hoop to be put on, or taken off, the mill.

My invention consists in improvements which permit of tires, hoops or the like, during the process of rolling, being rolled in width as well as in thickness.

According to the invention, first, I form one or both of the roll flanges with a slightly conical working face, secondly, I make one or both of the roll flanges with a conical working face and I move one rollshaft endways during the process of rolling, and thirdly, I arrange the thrust blocks which take the end thrust from the working faces of the roll flanges as separate units at the end of each roll shaft instead of on the roll shafts.

I will now describe my invention with the help of the accompanying drawings in which:—

Fig. 1 shows a sectional elevation of a mill of the type referred to, arranged in a known manner, a wheel tire being shown in section.

Fig. 2 is a diagrammatic end elevation, drawn to an enlarged scale, of the flanges of the rolls of the mill shown in Fig. 1, the tire being rolled being shown in section.

Fig. 3 is a side elevation of a pair of roll ends arranged according to this invention, the scale used being the same as that of Fig. 2, and Fig. 4 is a diagrammatic view corresponding with Fig. 2, but with the roll ends arranged as in Fig. 3.

Figure 5:
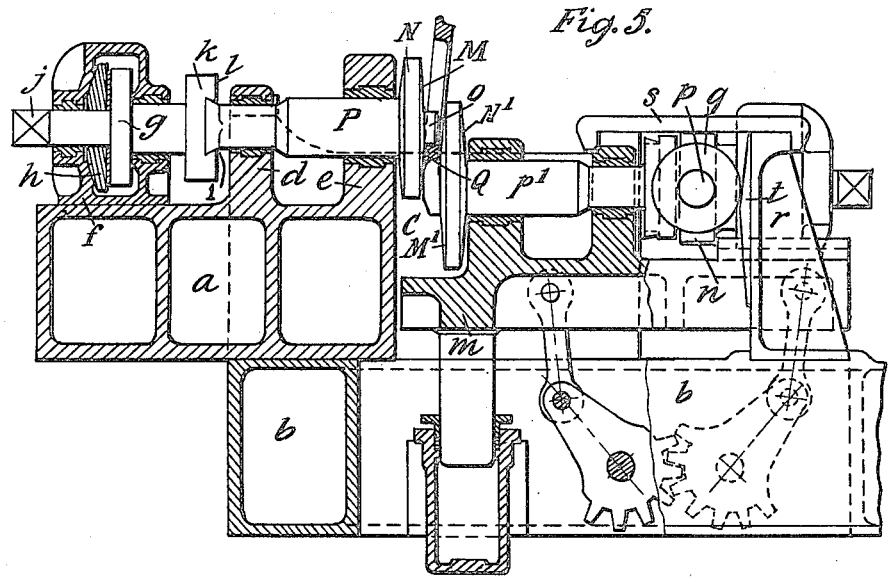
Fig. 5 is a longitudinal view partly in section.

In Fig. 1, which illustrates one form of the above type of mill arranged in a known manner, A, A' are the two roll shafts supported in bearings B, C, B', C' respectively. The bearings B, C are on a roll carriage J, which is fixed to the frame H of the mill, and the bearings B', C' are on the movable roll carriage J'; D and D' are the working barrels of the overhanging portions of the two rolls, E and E' are the working faces of the large diameter flanges associated therewith, F and F' are collars on the roll shafts, and G and G' are thrust block bearings attached to the roll carriages J and J' respectively, which bear against the collars F and F' and take the end thrust which is generated during rolling at the working faces E and E' of the large diameter flanges.

The thrust blocks and also the roll carriage J have longitudinal adjustments to suit the various widths of tires required to be rolled, but once adjusted they remain in a fixed position during the process of rolling.

The movable roll carriage J' is lifted by the hydraulic cylinder K so as to apply pressure to the tire or hoop being rolled, and the carriage is guided in a vertical direction by slides at L' on the carriage engaged with slides at L on the frame Z of the mill. These slides also take the end pressure generated between the two working faces E, E'.

Generally there would be some system of parallel motion to keep the carriage J' horizontal and there may be slides at the other end of the carriage J' to assist in taking the end thrust.

In the arrangement shown in Fig. 1, and in all known modifications and developments of this type of mill, the working faces E, E' of the roll flanges are flat, the direction of movement of the roll carriage is in a direction at right angles to the axes of the roll shafts and during the process of rolling neither of the roll shafts moves endways.

Owing to the flatness of the working faces of the flanges, they are in contact with the sides of the tire or hoop being rolled over a very considerable area, as shown in Fig. 2, where the shaded portion therein indicates the area of a portion of a hoop which is confined between and in contact with the overlapping flanges.

As the function of the flanges is to confine the sides of the tire or hoop, and to prevent lateral spread, it follows that, if they perform this function, the portion of the tire or hoop between the overlapping flanges is under pressure, and as the area in contact and under pressure is great, either the pressure per square inch on the side of the tire or hoop must be small, or the total end-thrust on the flanges must be great.

In rolling mills with rolls formed and arranged in the known manner as in Fig. 1, the end-thrust on the shafts is found in practice to be great, even when the flanges are used simply to confine the width of the material being rolled, and is too great to permit of the width of the tire or hoop being reduced during the process of rolling. Moreover, during rolling the space between the flanges remains the same and consequently the width of the punched bloom or blank must not be greater than what the finished tire or hoop is to be.

My first improvement as stated above, consists in making one or both flanges with slightly conical working faces as shown in Fig. 3, which shows the ends of a pair of rolls having flanges N, N' with conical working faces M, M' formed according to this invention; the working barrels are O, O' and the shafts P, P' are carried in bearings as shown in Fig. 5, and afterwards herein described.

In Fig. 3 both flanges are shown coned equally, and the axes of the roll shafts parallel with each other.

The overhanging portions or barrels O, O' are coned to correspond with the faces N, N' to give a tire or hoop Q the required section.

The faces of the flanges being conical, they are, theoretically, in contact with the sides of the tire or hoop on straight lines at each side, but, owing to the elasticity of the material being rolled, and to the side draught, the area in contact and under pressure may be fairly represented by the shaded portion R in Fig. 4.

The area of contact being comparatively small, if the function of the flanges be simply to prevent lateral spread, the end-thrust of the roll shafts is correspondingly small. Also, as the faces of the flanges are conical, the narrowest space between them lies in a plane which cuts the axes of both roll shafts, and, as the rolls rotate towards this plane, points on the faces of the opposing flanges approach each other, and rolling actions on the sides of the tire or hoop ensue.

This and the lessened end-thrust enables the space between the faces of the flanges being narrowed, and thus, starting with a bloom of greater width than the finished tire or hoop is to have, the sides of the bloom are rolled by the conical faces of the flanges, and the inner and outer peripheral faces thereof are rolled by the overhanging portions of the rolls, so that a cleaner and a better rolled tire or hoop is produced.

Now it will be seen that as the roll shaft P' lifts vertically, the width of the space between the conical roll faces M, M' decreases, and thus as the tire is reduced in thickness by the upward movement of the roll shaft P' it is also reduced in width by the action of the flange faces M, M'.

But the overhanging working barrel O carried by the roll shaft P being of fixed length the end of it cannot be in contact with the roll face M' before the tire or hoop is rolled to its required thickness, and during the process of rolling there is a decreasing gap between the end of the working barrel O and the face M' of the other roll.

At some stage of the rolling process this gap will allow a fin to form on the corner of the tire or hoop, and as the rolling continues more fin tends to form, and that which is formed is trapped in the gap and rolled thinner.

In consequence of this, if the gap is too great the fin formed is excessive, and either rolls back on the tire, or as it becomes chilled, it cuts the roll face M' and burrs the end of the working barrel O.

Now the greater the amount of conicity of the working face M′ of the flange N′, the greater is the gap at the commencement of rolling and the greater is the reduction of the gap after the fin is formed, and so the greater the fin produced.

Therefore, when rolls made in accordance with the first part of my invention are used with a simple vertical movement of the roll P′, the conicity of the working roll faces M, M′ must only be slight, that is to say the base angle of the cone must not exceed 15°.

I am aware that rolls having conical working faces have been previously suggested for a different type of mill, in which the roll shafts are not extended in opposite directions, and only one shaft, which is capable of movement or adjustment on end, is driven. In such mills, however, the base angle of the cone constituting the working face of a roll greatly exceeds 15°, the consequence being that a tire or hoop has to be passed through two pairs of rolls in succession, one pair of rolls being shaped differently from the other so that by the complementary action of the differently shaped rolls the tire could be rolled without finning. But by the first part of my invention if it is desired to roll a tire with a simple vertical movement of the roll shaft P′, I am able to do so with one pair of rolls without undue finning, by making the base angle of the cone on the working faces such that it does not exceed 15°.

Now it will be seen from the above that the amount of rolling in width which can be done with a simple vertical lift of the roll shaft P′ is dependent upon the amount of conicity of the roll faces, and it is also at any stage proportional to the reduction in thickness of the tire or hoop rolled.

Consequently, as the tendency to fin limits the amount of conicity, the reduction in width is also limited. Moreover, a tire or hoop which is reduced a small amount in thickness is also reduced a small amount in width, and conversely.

The object of the second part of my invention is to make the reduction in width independent of either the amount of conicity on the roll faces, or of the reduction in thickness, or of both, and I effect this by making one or both of the flange faces of conical form and making one of the roll shafts P, P′ move endways during the process of rolling.

I prefer to have the roll shaft P fixed to an adjustable thrust block and to give the thrust block of the roll shaft P′ an end movement by means of rollers or slippers on trunnions on the thrust block acting on former plates on the frame of the mill as more particularly described below.

The third part of my invention consists in making the thrust blocks, which in every known form of this type of mill are fitted over the roll shafts, as separate units at the ends of those shafts.

The advantages of this part of my invention are:—

(1) There is no restriction on the space occupied by the separate unit thrust blocks, and consequently I can use a larger and better designed thrust block than is possible under the present known arrangements. This is of utmost consequence, as it enables the greater thrust caused by the reduction of the tire or hoop in width during rolling to be dealt with.

(2) The roll shaft can be changed much more quickly as it not necessary to disturb the separate unit thrust blocks.

Figure 6:
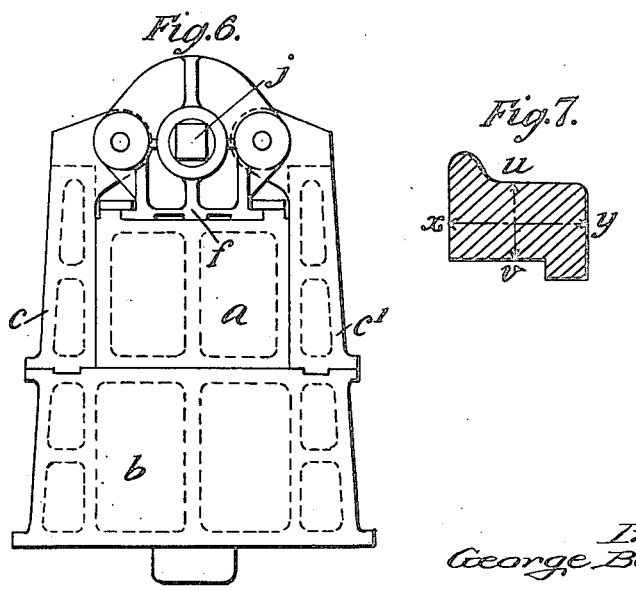
Fig. 6 is an end elevation of a mill of the type referred to, arranged according to this invention, the same being drawn to a scale substantially the same as that of Fig. 1.
Figure 7:
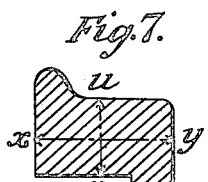
Fig. 7 is an enlarged cross section of a rolled tire. In the following description the dimension from $u$ to $v$, as indicated in this figure, is referred to as the thickness of the tire, and the dimension from $x$ to $y$ as the width.

I will now proceed to describe more particularly the second and third part of my invention by reference to Figs. 5 and 6, which show, respectively, a longitudinal view mainly in section and an end elevation of the mill embodying my improvements.

The fixed roll carriage $a$ is firmly attached to the bed of the mill $b$ and on each side of it are side frames $c$ and $c'$, which are also attached to the bed $b$.

The roll carriage has bearings $d$, $e$, carrying the roll shaft P, and it is extended and carries the thrust block unit. The base $f$ of the thrust block unit works in slides on the roll carriage $a$, and the whole unit can be adjusted longitudinally by means of tie bars which are not shown in Fig. 5 but extend from the unit to the side frames $c$, $c'$.

$g$ is a large diameter collar on the thrust block shaft, $h$ is a fixed collar on a spherical bearing on the thrust block frame and is fitted with anti-friction metal, preferably in pads.

Motive power is applied to the thrust block unit shaft at $j$ and is transmitted to the roll shaft P, through the slotted disc $k$, the roll shaft P having a rectangular end $l$ to fit the slot in disc $k$. The roll shaft P is free to move endways in its bearings and is prevented from drifting forward by means of the dovetailed end $l$ in the slot in $k$.

In order to change a roll shaft P it is only necessary to rotate the shaft if necessary, until it occupies a position at right angles to that shown in Fig. 5 (i. e. corresponding to that of shaft P′ in Fig. 5), and then when the bearing caps are removed it can be lifted straight out.

The movable roll carriage $m$ is guided in vertical slides, not shown, in the side frames $c$, $c'$, and is kept horizontal by a parallel motion as shown, or by some similar device.

The arrangement of the roll shaft and thrust block is exactly the same as for the fixed roll carriage except that instead of the thrust block being attached to the side frames by the bolts, it is attached to a yoke $n$ having trunnions $p$ carrying rollers $q$.

Attached to either side of the bed $b$ of the mill, are two standards $r$, and the tops of these standards are tied to the side frames $c, c'$ by means of clamp plates $s$. The faces of $r$ carry former plates $t$ on which the rollers $q$ work.

It will be seen that as the roll shaft P' is lifted, it is given end movements to correspond to the face of the former plate $t$.

The object of the form of the former plate shown is to give the roll shaft a movement forward during the early stages of rolling after which it follows a path parallel to the face M' of the cone on the working face of the flange N', whereby the tire is rolled in width during the early stages of rolling and the gap between the end of the working barrel O and the working face M' of the flange N' is closed before a fin forms. But the former plates may be of any form so as to make the end of the roll shaft move along any desired path.

In both Figs. 3 and 5, the roll shaft which acts on the outside of the tire or hoop is shown as being on the movable roll carriage, but this roll shaft may be on a fixed roll-carriage, and the roll-carriage carrying the roll shaft which acts on the inside of the tire or hoop may be made the movable one, the general design of the mill being altered to correspond.

Having thus described the nature of the said invention and the best means I know of carrying the same into practical effect, I claim:—

1. In a tire and hoop rolling mill of the type described, a pair of driven shafts having their axes extending in opposite directions in one plane, a roll on each shaft, a thrust block bearing for each roll, and a large diameter working flange on each roll, the flanges and rolls arranged to co-operate and form a box-like pass in which the rolling of a tire or hoop is effected, one of said flanges having a conical working face of which the base angle of the cone is not greater than 15°.

2. In a tire and hoop rolling mill of the type described, a pair of driven shafts having their axes extending in opposite directions in one plane, a roll on each shaft, a thrust block bearing for each roll, and a large diameter working flange on each roll, the flanges and rolls arranged to co-operate and form a box-like pass in which the rolling of a tire or hoop is effected, each of said flanges having a conical working face, the base angle of the cones being not greater than 15°.

3. In a tire and hoop rolling mill of the type described, a pair of driven shafts having their axes extending in opposite directions in one plane, a roll on each shaft, a thrust block bearing for each roll, a large diameter working flange on each roll, and means for moving one roll shaft endways relatively to the other during the process of rolling a tire or hoop, the flanges and rolls arranged to co-operate and form a box-like pass in which the rolling of the tire or hoop is effected, each of said flanges having a conical working face.

4. In a tire and hoop rolling mill of the type described, a bed member, a stationary carriage attached to the bed, bearings supported by the carriage, a driven shaft mounted in said bearings, a roll carried by the shaft, a second carriage mounted to slide horizontally on the bed, bearings supported on the second carriage, a second driven shaft mounted on last said bearings, the shafts being arranged with their axes extending in opposite directions in one plane, a roll on the second shaft, a thrust block bearing mounted on each carriage as a separate unit and independently of the corresponding roll shaft but in a manner to co-operate therewith, a large diameter working flange on each roll, the flanges and rolls being arranged to form a box-like pass in which the rolling of a tire or hoop is effected, each of said flanges having a conical working face, and means for moving the slidably mounted carriage and corresponding roll shaft in an axial direction during a rolling operation.

5. In a tire and hoop rolling mill of the type described, a bed member, a stationary carriage attached to the bed, bearings supported by the carriage, a driven shaft mounted in said bearings, a roll carried by the shaft, a second carriage mounted to slide horizontally on the bed, bearings supported on the second carriage, a second driven shaft mounted on last said bearings, the shafts being arranged with their axes extending in opposite directions in one plane, a roll on the second shaft, a thrust block bearing adjustably mounted on each carriage as a separate unit and independently of the corresponding roll shaft but in a manner to co-operate therewith, a large diameter working flange on each roll, the flanges and rolls arranged to form a box-like pass in which the rolling of a tire or hoop is effected, each of said flanges having a conical working face, and means for moving the slidably mounted carriage and corresponding roll shaft in an axial direction during a rolling operation.

6. In a tire and hoop rolling mill of the type described, a bed member, a stationary carriage attached to the bed, bearings supported by the carriage, a driven shaft mounted in said bearings, a roll carried by the shaft, a second carriage mounted to slide horizontally and vertically on the bed, bearings supported on the second carriage, a second driven shaft mounted on last said bearings, the shafts being arranged with their axes extending in opposite directions in one plane, a roll on the second shaft, a thrust block bearing mounted on each carriage as a separate unit and independently of the corresponding roll shaft but in a manner to co-operate therewith, a large diameter working flange on each roll, the flanges and rolls being arranged to form a box-like pass in which the rolling of a tire or hoop is effected, each of said flanges having a conical working face, and means for moving the slidably mounted carriage and corresponding roll shaft both horizontally and vertically simultaneously during a rolling operation.

In testimony whereof I have signed my name to this specification.

GEORGE BAKER.